United States Patent

Hilbig

[15] 3,695,387
[45] Oct. 3, 1972

[54] SOUND SUPPRESSION SYSTEM FOR FAN JET ENGINES

[72] Inventor: Jack H. Hilbig, Chula Vista, Calif.

[73] Assignee: Rohr Corporation, Chula Vista, Calif.

[22] Filed: Sept. 8, 1970

[21] Appl. No.: 70,410

[52] U.S. Cl. .....181/33 HC, 239/265.13, 239/265.29, 239/265.41
[51] Int. Cl. .............................................B64d 33/06
[58] Field of Search ........181/33 HB, 33 HC, 33 HD; 239/265.13, 265.29, 265.41

[56] References Cited

UNITED STATES PATENTS

| | | | |
|---|---|---|---|
| 3,524,588 | 8/1970 | Duval | 181/33 HC X |
| 3,061,038 | 10/1962 | Lawler et al. | 181/33 HC X |
| 3,360,074 | 12/1967 | Ranvier et al. | 181/33 HC X |
| 2,978,061 | 4/1961 | Keen | 181/33 HC X |
| 2,997,845 | 8/1961 | Oulianoff | 181/33 HC X |
| 3,151,701 | 10/1964 | Duthion et al. | 181/33 HC X |
| 3,263,931 | 8/1966 | Barzek et al. | 181/33 HC X |
| 3,550,721 | 12/1970 | Bruner | 239/265.13 X |

FOREIGN PATENTS OR APPLICATIONS

1,526,899  4/1968  France ..................181/33 HC

Primary Examiner—Richard B. Wilkinson
Assistant Examiner—John F. Gonzales
Attorney—George E. Pearson

[57] ABSTRACT

A sound suppression system for a fan jet engine having a primary nozzle for discharging engine exhaust gases and a secondary nozzle surrounding and spaced from the primary nozzle to form therewith an annular flow path for fan air surrounding the exhaust gas stream. A shroud is attached to and forms a continuation of the secondary nozzle to define a discharge zone which receives and controls the exhaust gas and air streams. A plurality of circumferentially spaced elongate ducts are pivotally connected at their forward ends to the shroud to swing between stowed position just outside of the shroud wall, to deployed position converging rearwardly with their aft ends substantially in contact with each other and with a coaxial bullet to partially block rearward flow of exhaust gas and to divert it radially outwardly into the air stream through divergent passages defined by the ducts. Each duct has a forwardly facing inlet port at its forward end and a rearwardly facing outlet port in its aft end. When deployed, fan air is ram-fed into the former ports, flows through the ducts and is discharged into the exhaust gas stream from the latter ports. The result is a thorough intermixing of fan air and exhaust gas prior to leaving the shroud, thereby reducing temperature and velocity of the air-gas mixture and lowering jet noise.

12 Claims, 3 Drawing Figures

PATENTED OCT 3 1972  3,695,387

INVENTOR.
JACK H. HILBIG
BY
*George E. Pearson*
ATTORNEY

SOUND SUPPRESSION SYSTEM FOR FAN JET ENGINES

BACKGROUND OF THE INVENTION

This invention lies in the field of sound suppression of gas turbine or jet engines, which produce reaction thrust by ejecting a high velocity stream of gas from the exhaust nozzle or tail pipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low flying airplanes, as during takeoff and climb, at an energy level which is not acceptable to the public.

The invention is directed to a system in which air is mixed with the exhaust gas to cool it and reduce the exit velocity of the gas stream, which reduces the total jet noise. It is directed particularly to a system of this type applied to a fan jet engine in which maximum use is made of the fan air in reducing the noise level. While various schemes have been proposed for applying sound suppression systems to fan jet engines, so far as known none of them has made full use of the possibilities for achieving optimum results.

SUMMARY OF THE INVENTION

The present invention provides a very satisfactory solution to the problem with a relatively small amount of equipment and few moving parts, most of which are quite simple in form and of duplicate type. Generally stated, the system is intended for location immediately aft of a typical fan jet engine having a primary exhaust gas nozzle surrounded by a secondary fan air nozzle. The system includes a shroud which is attached to and forms a continuation of the secondary nozzle and defines a discharge zone.

A plurality of elongate ducts are spaced around the periphery of the shroud and are pivotally connected at their forward ends to the shroud on transverse axes to swing in radial planes containing the shroud axis. In stowed position the ducts lie just outside of the shroud wall and generally parallel to the shroud axis. They swing through individual apertures in the shroud wall to deployed positions in which they converge radially inwardly and rearwardly with their aft ends substantially in lateral contact with each other to form a partial barrier to rearward flow of the combined gases in the discharge zone with the secondary nozzle. Since they diverge radially outwardly, they form, with the shroud wall, triangular passages through which some of the turbine exhaust gas is diverted outwardly into the surrounding fan air stream and mixed.

When the ducts are deployed, their forward ends are adjacent to the shroud wall in the zone of the fan air stream. An inlet port is formed in the forward side of the forward end of each duct so that it is open to the ram effect of the fan air flow. An outlet port also is formed in the aft side of the aft end of each duct to discharge the air flowing therethrough substantially rearwardly in the turbine exhaust gas stream. Thus, a substantial amount of the fan air is thoroughly mixed with the turbine exhaust gas. Individual shields are mounted over each aperture and duct mounting to prevent leakage of fan air through the shroud wall.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENT

Figure 1:
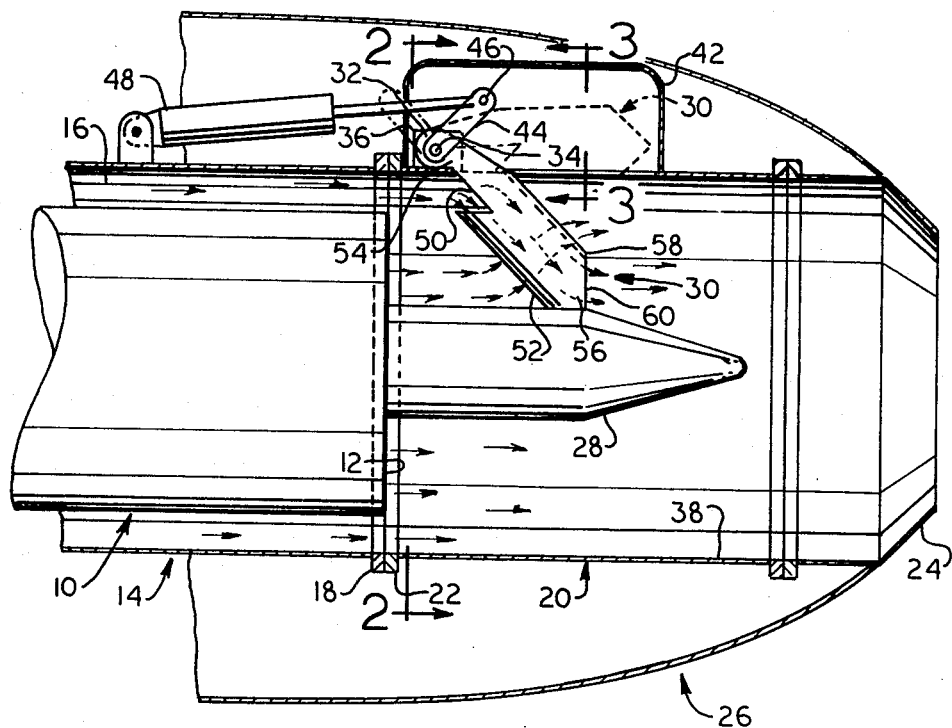
FIG. 1 is a schematic longitudinal section through the assembly.

The general arrangement of the system of the invention is illustrated in FIG. 1, in which a typical fan jet engine, not shown, is provided with a rearwardly discharging primary jet nozzle 10 having an exit plane 12. A secondary nozzle 14 surrounds the primary nozzle and is radially spaced therefrom to define a passage 16 for the rearward flow of air from the fan or compressor of the engine, and has an attachment flange 18 at its exit plane. A shroud or tail pipe 20 which is generally cylindrical has a flange 22 at its leading edge connected to the flange 18 of the secondary nozzle to form a continuation thereof and may terminate in a convergent nozzle section 24. In the presently preferred form, a bullet 28 is mounted coaxially aft of the engine. The entire engine assembly and the major part of the shroud are preferably encased in a cowl 26 which may be a nacelle, the aft portion of a fuselage, or other aircraft structure.

A plurality of elongate ducts 30, only one of which is shown in FIG. 1 for simplicity, are mounted in symmetrically spaced relation around the periphery of the shroud. Each duct has a tab 32 at its forward end which is pivotally mounted at 34 to a bracket 36 for swinging about a transverse axis in a radial plane containing the axis of the shroud. Duct 30 is shown in solid lines in FIG. 1 in deployed position and in broken lines in stowed position where it lies just outside of the shroud wall 38. In moving between stowed and deployed positions it passes through a narrow, axially directed aperture 40 in the shroud wall, best seen in FIG. 3. An individual aperture is provided for each duct, and an individual shield 42, which is substantially closed, is provided to overlie each duct and its aperture to minimize leakage of fan air through the shroud wall 38.

Figure 3:
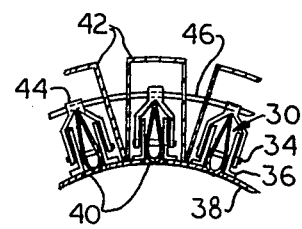
FIG. 3 is a sectional view taken on line 3—3 of FIG. 1.

The tab 32 of each duct is provided with a lever arm 44 which is linked to drive ring 46, FIG. 3, which moves axially to cause all of the ducts to stow and deploy in unison. The drive ring is moved by a plurality of actuators 48, preferably at least three.

Considering the duct 30 in its deployed, solid line position of FIG. 1, it will be seen that it is provided with an inlet port 50 at the forward side or edge 52 of its forward end 54 which is located in the zone of the fan air stream so that it is subjected to ram pressure. The aft end 56 of the duct is provided at its aft side or edge 58 with an outlet port 60 which faces rearward in the zone of turbine exhaust gas flow. Thus each duct delivers a stream of the fan air under ram pressure to the zone of turbine exhaust gas flow and directs it rearward to mix with the gas. The duct itself is of streamlined cross sectional shape with its major transverse axis directed for-and-aft, its forward edge 52 being rounded and its aft edge 58 being sharp.

Figure 2:
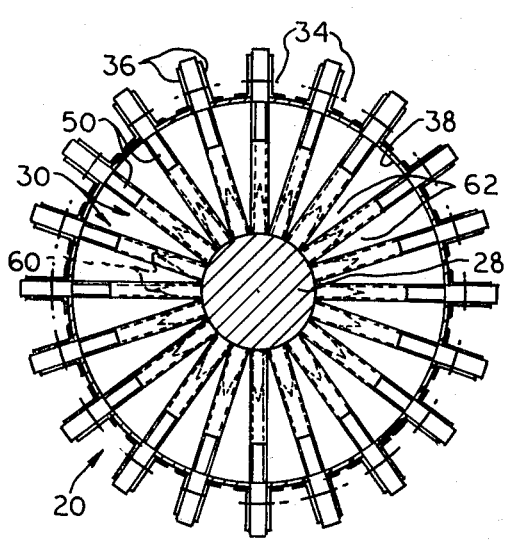
FIG. 2 is a sectional view taken on line 2—2 of FIG. 1.

It will be noted in FIG. 2 that a relatively large number of ducts 30 are provided, and that they are spaced evenly around the periphery of the shroud. When they are in the deployed position as shown in FIG. 2 and in solid lines in FIG. 1 their aft ends 56 converge and preferably contact both the bullet 28 and each other. Therefore the zone immediately around the bullet is greatly constricted and substantially blocks flow of gas near the bullet. However, the ducts diverge from each other in the direction of the shroud wall 38 and form with it a series of passages 62 of triangular cross section with the widest part in the zone of the fan air flow. Thus a large part of the turbine exhaust gas is diverted out into the fan air flow zone and mixes thoroughly therewith to produce a substantial reduction of the noise level.

The invention provides a simple and effective means for inducing an intimate mixture of turbine exhaust gas and fan air in the discharge zone within the shroud or tail pipe before the mixture is ejected into the atmosphere.

Having thus described the invention, what is claimed as new and useful and is desired to be secured by U. S. Letters Patent is:

1. A sound suppression system for use in combination with a fan jet engine having a rearwardly discharging primary nozzle for the turbine exhaust gas stream and a secondary nozzle surrounding the primary nozzle and radially spaced therefrom for rearward flow of the fan air stream around the exhaust gas stream, comprising: a shroud connected to the secondary nozzle and forming a continuation thereof and defining a discharge zone to receive and control the turbine exhaust gas and fan air streams, a plurality of ducts mounted within the discharge zone in circumferentially spaced relation about the shroud axis, each duct having an end thereof in one of such streams and being directed into the other stream, each duct having a port adjacent each end thereof and one end each of said ducts contacting each other near the center of the primary stream, said ports being located and directed to provide a ram-flow of a portion of said fan air stream into one of such ports, lengthwise through the duct, and out of the other of such ports directly into the center of the exhaust stream.

2. A sound suppression system as claimed in claim 1 wherein each duct is mounted for movement between an operative position as defined in claim 1 and a stowed position substantially clear of both streams.

3. A system as claimed in claim 2, each duct in stowed position lying outside of the shroud wall to avoid interference with stream flow and an elongate, axially directed aperture in the shroud wall for each duct to move into the discharge zone during deployment.

4. A system as claimed in claim 3, a substantially closed shield overlying each aperture on the outer wall of the shroud to receive the stowed duct and to prevent leakage of the air stream through the shroud wall.

5. A system as claimed in claim 2, each duct being pivotally mounted adjacent one end thereof for swinging movement between stowed and deployed position.

6. A system as claimed in claim 5 including a lever arm on each duct, an axially movable drive ring encircling the shroud and a drive line connected to the lever arms to swing the ducts between stowed and deployed positions; and a plurality of actuators connected to the drive ring.

7. A system as claimed in claim 5, the pivotal mounting of each duct being adjacent its forward end, each duct being swingable to a rearwardly convergent deployed position with its forward end adjacent to the shroud wall and its aft end in the exhaust gas stream.

8. A system as claimed in claim 7, the port in the forward end of each duct being in the forward side to receive fan air, and the other port being in the aft side to discharge such fan air into the exhaust gas flow.

9. A system as claimed in claim 7, the aft ends of the ducts in deployed position being substantially in contact with each other to partially block rearward flow of exhaust gas and defining between them flow paths which diverge toward the shroud wall, serving to divert exhaust gas outwardly toward and into the surrounding fan air stream.

10. A system as claimed in claim 7, and a bullet mounted coaxially behind the engine to define an inner wall of the total flow path; the aft ends of the ducts in deployed condition substantially contacting both the bullet and each other.

11. A system as claimed in claim 1, each duct having a streamlined cross sectional shape with a rounded leading edge and a sharp trailing edge.

12. A sound suppression system for use in combination with a fan jet engine having a rearwardly discharging primary nozzle for the turbine exhaust gas stream and a secondary nozzle surrounding the primary nozzle and radially spaced therefrom for rearward flow of the fan air stream around the exhaust gas stream, comprising: a shroud connected to the secondary nozzle and forming a continuation thereof and defining a discharge zone to receive and control the turbine exhaust gas and fan air streams, and a plurality of elongate ducts mounted within the discharge zone in peripherally spaced relation around the shroud; each duct being pivotally mounted adjacent one end thereof to the shroud for swinging movement about a transverse axis in a radial plane containing the longitudinal axis of the shroud between a first, stowed position in which the longitudinal axis of each duct is generally parallel to the longitudinal axis of the shroud, and a second, deployed position in which each duct is inclined at a substantial angle to the axis of the shroud with one end each of said ducts contacting near the center of the primary stream, with one end thereof in the fan air stream, an open port being provided in each end of the duct, said ports being located and directed to provide a flow of a portion of one of the streams through the duct directly into the center of the exhaust stream.

* * * * *